United States Patent [19]
Le Gouzouguec et al.

[11] Patent Number: 5,883,969
[45] Date of Patent: Mar. 16, 1999

[54] PROCEDURE AND DEVICE FOR DETECTING THE MOVEMENT OF A TARGET AND THEIR APPLICATIONS

[75] Inventors: Anne Le Gouzouguec, Vanves; Christophe Schlossers, Chatillon, both of France

[73] Assignee: Aerospatiale Societe Nationale Industrielle, Paris, France

[21] Appl. No.: 653,332

[22] Filed: May 24, 1996

[30] Foreign Application Priority Data

Jun. 1, 1995 [FR] France ................................. 95 06516

[51] Int. Cl.⁶ ..................................................... G06K 9/00
[52] U.S. Cl. .......................... 382/103; 348/169; 348/700; 382/107
[58] Field of Search ................................... 382/103, 236; 348/169, 699, 700, 701

[56] References Cited

U.S. PATENT DOCUMENTS

| | | | |
|---|---|---|---|
| 3,829,614 | 8/1974 | Ahlbom et al. | 178/6.8 |
| 4,240,101 | 12/1980 | Michael et al. | 358/11 |
| 4,364,089 | 12/1982 | Woolfson | 358/125 |
| 5,283,839 | 2/1994 | Edelman et al. | 382/103 |
| 5,291,563 | 3/1994 | Maeda | 382/103 |
| 5,390,133 | 2/1995 | Sohie | 364/516 |
| 5,586,202 | 12/1996 | Ohki et al. | 382/236 |
| 5,587,927 | 12/1996 | Nagao et al. | 364/514 A |
| 5,594,813 | 1/1997 | Fandrianto et al. | 382/236 |
| 5,627,586 | 5/1997 | Yamasaki | 348/169 |
| 5,631,975 | 5/1997 | Riglet et al. | 382/173 |
| 5,633,946 | 5/1997 | Lachinski et al. | 382/103 |

FOREIGN PATENT DOCUMENTS 29 37 284 A1  3/1980  Germany.

OTHER PUBLICATIONS

Yachida et al., "Automatic Analysis of Moving Images", IEEE Transactions on Pattern Analysis and Machine Intelligence, vol. PAMI–3, No. 1, Jan. 1981, pp. 12–19.

Celenk et al., "Moving Object Tracking in Industrial Work Stations", Advances In Instrumentation, vol. 43, Part 1, 1988, pp. 289–304.

French Search Report dated Mar. 8, 1996, 3 pages.

Primary Examiner—Joseph Mancuso
Assistant Examiner—Jayanit K. Patel
Attorney, Agent, or Firm—Marshall, O'Toole, Gerstein, Murray & Borun

[57] ABSTRACT

A device and a process for detecting the movement of a target observed in the field of view of an optical detector in which a differential image is determined from two successive pictures of the field of view, a binary image is formed from the differential image and from a binary conversion threshold, moving zones in the binary image are individualized, individual envelopes surrounding the zones are determined, an overall envelope surrounding the individual envelopes is determined, and it is determined whether there is movement of the target from the individual envelopes and the overall envelope.

12 Claims, 3 Drawing Sheets

PROCEDURE AND DEVICE FOR DETECTING THE MOVEMENT OF A TARGET AND THEIR APPLICATIONS

BACKGROUND OF THE INVENTION

The present invention relates to a procedure for detecting the movement of a target observed in the field of view of an optical detector and to a device for implementing said procedure, as well as applications of said procedure for locating a target.

The present invention is particularly, but not exclusively, well suited to target-tracking devices, associated, for example, with means of destroying the targets tracked and determining the location and possibly the movement of the target on the basis of the processing of pictures of the field of view of an associated optical detector observing said target.

One of the main difficulties in such image processing lies in the need to carry out the processing, in this case movement detection, in real time since, in the applications in question, the results must be immediately available.

In addition, the movement detection envisaged must be able to be made even, or especially, when the target is not exactly centered within the picture being processed, which, of course, poses many technical problems.

SUMMARY OF THE INVENTION

The object of the present invention is to remedy these drawbacks. It relates to a procedure making it possible to detect, accurately and rapidly, the movement of a target observed in the field of view of an optical detector from two successive pictures of said field of view, each of said pictures being formed by a matrix of pixels.

For this purpose, according to the invention, said procedure is noteworthy in that the following operations are carried out:
  a) a differential image is determined from two identical size analysis images corresponding respectively to at least part of said successive pictures, said differential image corresponding to a matrix of pixels and the value of each of the pixels of said matrix corresponding to the absolute value of the difference in the gray levels of the pixels located at the same position respectively in said two analysis images;
  b) a binary image is formed from said differential image and from a defined binary conversion threshold, the pixels of said binary image taking a first value if the values of the corresponding pixels of the differential image are greater than or equal to said binary conversion threshold, and a second value if not;
  c) the zones, the pixels of which have said first value, are individualized on said binary image;
  d) an individual envelope, of defined shape, preferably rectangular, surrounding said individualized zone, is determined for each of said individualized zones;
  e) an overall envelope, of defined shape, preferably rectangular, surrounding the individual envelopes thus formed, is determined; and
  f) it is deduced:
    that, if less than two individual envelopes exist and/or if the overall envelope has an area which is less than a predefined area, no movement of the target is detected;
    and if not, that a movement of the target is detected, it being possible in this case to determine a characteristic outline corresponding to said movement of the target and relating to the position of the target in the second of said pictures.

Thus, by virtue of the invention, it is possible to determine, rapidly and precisely, any movement of the target by employing simple processing steps.

In addition, by virtue of said characteristic outline, it is possible to determine the characteristics of the moving target, as explained hereinbelow.

Advantageously, in order to determine said characteristic outline, the direction of movement of the target in said pictures being assumed known:
  α) for each of the lines of the overall envelope, the following operations are carried out:
    a configuration formed by two groups of the same number of adjacent pixels having said first value is sought, as is an intermediate zone of pixels having said second value, this being located between said groups;
    if such a configuration exists, a characteristic segment formed by said intermediate zone and by the group located downstream in the direction of movement of the target is determined, and if not, the procedure passes to the next line of the overall envelope; and
  β) the characteristic segments thus determined are grouped together so as to obtain said characteristic outline.

In a highly advantageous embodiment of the invention, in order to determine the binary conversion threshold relating to a differential image:
  the luminance of all the pixels of the differential image is determined;
  a histogram representing the number of pixels per increasing luminance value is formed;
  an upper luminance value Lsup, corresponding to the luminance in said histogram, is determined from a first percentage of the total number of said pixels;
  a lower luminance value Linf, corresponding to the luminance in said histogram, is determined from a second percentage, less than said first percentage, of the total number of said pixels; and
  the binary conversion threshold S is computed from the equation $S=(Lsup+Linf)/2$.

Preferably, when the detection is made from at least three successive pictures and when at least two successive binary images are formed from said pictures, between steps b) and c) of the aforementioned procedure, temporal filtering of the binary image in question is carried out, employing a logic OR between said binary image and the preceding binary image, thereby eliminating the parasitic movements which do not have temporal coherence.

Moreover, advantageously, between steps c) and d) of the procedure in accordance with the invention, all the individualized zones having an area which is greater than a predefined area are selected and the subsequent steps of said procedure are carried out by using only the individualized zones thus selected, thereby eliminating the too small individualized zones from the processing, especially when they are too numerous, such small size zones generally being due to parasitic movements.

The procedure in accordance with the invention makes it possible in addition to determine a reference pattern of the moving target. For this purpose, according to the invention, the position of said characteristic outline is identified in the analysis image of the last of said pictures and the pixels corresponding to this position are extracted, the pixels thus extracted forming said reference pattern of the target.

The present invention also relates to a device making it possible to implement the aforementioned procedure. For this purpose, said device advantageously includes:

- means for taking pictures of the field of view of the optical detector;
- means for extracting analysis images from the pictures;
- means for determining a differential image from the analysis images of two successive pictures;
- means for determining a binary image; means for individualizing the zones of the binary image, the pixels of which have said first value;
- means for forming individual envelopes and an overall envelope; and
- analyzing means for determining whether or not a movement of the target is detected, said analyzing means being capable of determining, as the case may be, said characteristic outline; as well as, if necessary:
  - means for determining the reference pattern of the target; and/or
  - means for determining the binary conversion threshold.

Moreover, the present invention also relates to applications of the procedure in accordance with the invention in order to determine the location of a target observed in the field of view of an optical detector, said applications allowing improvement to the method of locating a target disclosed by the Applicant in French Patent Application 2,706,721 entitled "Procedure and device for determining the location of a target".

The method mentioned in this document has the following characteristics:

- in a preliminary step, a picture of the field of view of the optical detector is taken and a model of the background, including at least one partial image of the background, and a model of the target, including at least one reference pattern representing at least one partial image of the target, as well as kinematic characteristics of the latter, are determined; and
- throughout the location determination time, the following steps are repeated:
  - a current picture of the field of view is taken;
  - at least one background search window is isolated from said current picture;
  - the partial image of the background is sought in said isolated search window;
  - the movement of the optical detector between the preceding picture and said current picture is computed from the position of this partial image in said search window;
  - a target search window is isolated from the current picture, taking into account the computed movement of the optical detector and of the position of the target in the preceding picture;
  - the reference pattern of the target in said isolated search window is sought;
  - the movement of the target with respect to the background is computed from the position of this reference pattern in said search window;
  - said computed movement of the target is compared with two, minimum and maximum, movement values determined from the kinematic characteristics of the target so that, if the computed movement lies between said two values, the location of the target obtained by this computed movement is validated, and if not an estimated position of the target is determined from the kinematic characteristics of the latter; and
  - the background and target models are conditionally updated.

A first application of the procedure in accordance with the invention for locating a target, using the aforementioned method, is noteworthy according to the present invention in that the procedure in accordance with the invention is implemented with each picture and the target model is updated, at least partially, when a movement of the target is detected.

A second application of the procedure in accordance with the invention for locating a target, also using said aforementioned method, is noteworthy in that, in order to update the reference pattern of the target model, the aforementioned procedure making it possible to determine the reference pattern of the target is implemented.

The figures of the appended drawing will make it clear how the invention may be realized. In these figures, identical references designate similar elements.

DETAILED DESCRIPTION OF A PREFERRED EMBODIMENT

Figure 1:
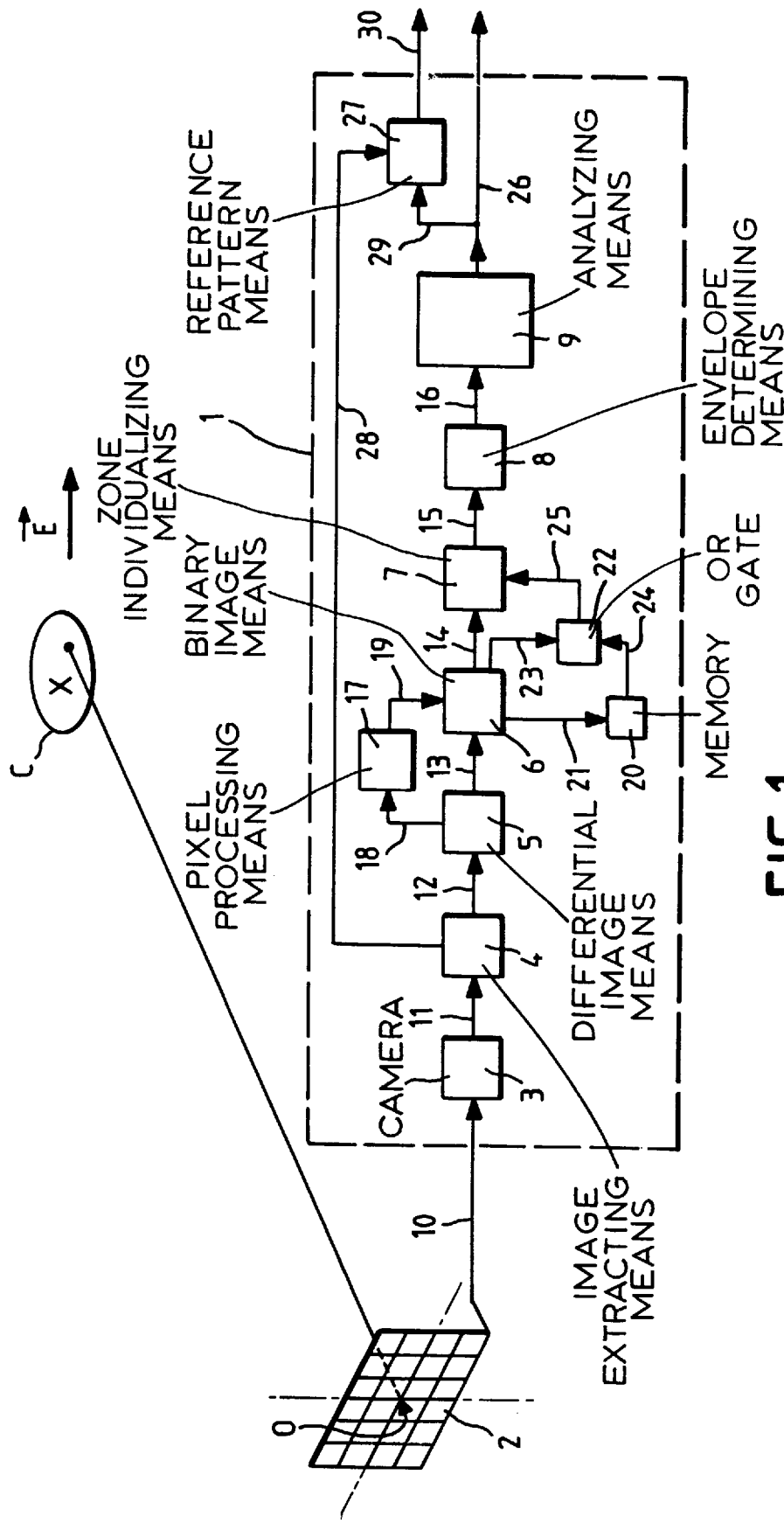
FIG. 1 shows the block diagram of the device in accordance with the invention, associated with an optical detector aimed at a target.

The device 1, in accordance with the present invention and shown by its block diagram in FIG. 1, is intended to detect the movement of a target C observed in the field of view of an optical detector 2 aimed along an axis OX, the device 1 being connected for this purpose to said optical detector 2.

The present invention is particularly, although not exclusively, well suited to tracking a target, being associated, for example, for this purpose with a weapon system, not shown, equipped with said optical detector 2, as described hereinbelow by way of example.

According to the invention, the device 1 includes main means 3 to 9 which are respectively connected together by links 11 to 16 and are intended to implement respectively the successive steps of the procedure in accordance with the invention, explained in the description of said device 1.

More precisely, said device 1 includes picture-taking means 3 connected via a link 10 to the optical detector 2 and capable of taking a picture of the field of view of the latter. The picture-taking means 3 and the optical detector 2 connected together constitute, for example, a camera working in the visible or infrared.

Figure 2:
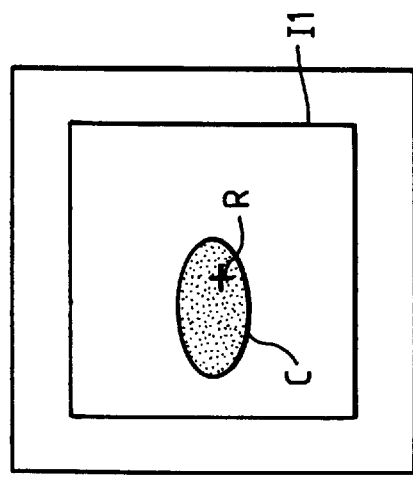

FIG. 2 shows a picture PV1 of the field of view for one position of said optical detector 2, corresponding to the position shown in FIG. 1.

In this picture PV1, which is formed by a matrix of pixels, the target C is offset to the left with respect to superimposed cross hairs R defining the center of the field of view and corresponding to the direction of the axis OX.

For reasons of simplification of the drawing and of the corresponding description, only the target C has been shown in this picture PV1. Of course, in the case where the picture relates to part of the scenery, said picture may include many other elements, such as natural elements of said scenery and/or artificial objects which may or may not be moving.

Figure 3:
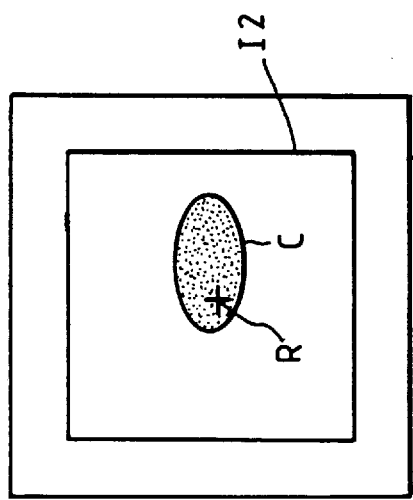
FIGS. 2 and 3 illustrate two successive pictures of the field of view of the optical detector.

In order to implement the invention, two successive pictures are required. Thus, FIG. 3 shows a second picture PV2 of said field of view of the optical detector 2, which is regarded as stationary, said second picture PV2 being taken subsequent to the first picture PV1, after a movement of the target C in the direction of the arrow $\vec{E}$, as may be seen in FIGS. 2 and 3.

It will be noted that, in the case where, in addition to the movement of the target C, the optical detector 2 also moves between the two pictures PV1 and PV2, the visible relative movement of the target in the two pictures is then, of course, due to these two movements.

The pictures PV1 and PV2 generated by the means 3 are transmitted via the link 11 to the means 4 intended for extracting from said pictures PV1 and PV2 analysis images I1 and I2 which have identical defined sizes and are located respectively at the same position with respect to said pictures PV1 and PV2.

In the case where the positions of the target C in the various pictures are known, at least approximately, said analysis images are roughly centered on these positions.

Thus, in the example shown in FIGS. 2 and 3, in which the target is moving close to the cross hairs R, the analysis images I1 and I2 are located approximately at the center of the pictures PV1 and PV2.

The processing in accordance with the invention is carried out on the analysis images I1 and I2 thus extracted and transmitted to the means 5. According to the invention, during implementation of the invention, the image processing zone in question may be reduced compared to said analysis images I1 and I2 in order to increase the speed and precision of the processing, as well as to eliminate detections which must not be taken into account, that is to say parasitic movements. Thus, when a target movement is detected in a defined region of a scan image I1 or I2, the processing zone may be focused on this defined region. This may be carried out, as the case may be, by successive iterations.

Figure 4:
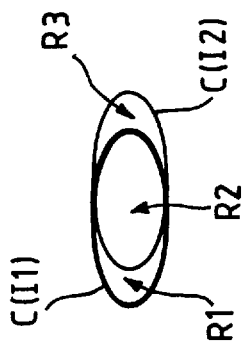
FIG. 4 illustrates the movement of the target between the two successive pictures of FIGS. 2 and 3.
Figure 5:
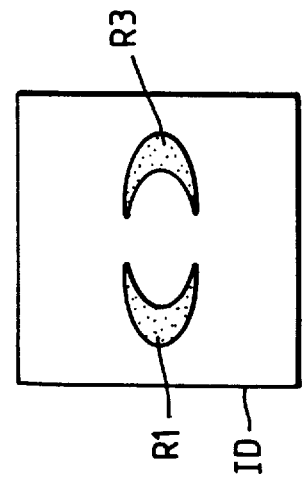

As regards the means 5, they determine a differential image ID, shown in FIG. 5, from received said analysis images I1 and I2, as explained by FIG. 4 for the target C.

Superimposed in FIG. 4 are the positions C(I1) and C(I2) of the target C respectively in the two analysis images I1 and I2. This representation shows three different regions:

a region R1 consisting of pixels belonging to the target C in the scan image I1 and to the background of the field of view of the optical detector 2 in the scan image I2, as a result of the movement of the target C;

a region R2 consisting of pixels belonging to the target C both in the scan image I1 and in the scan image I2; and a region R3 consisting of pixels belonging to the background in the scan image I1 and to the target C in the scan image I2.

only the regions R1 and R3, which demonstrate that the target is moving, are taken into account in the differential image ID, as explained hereinbelow.

Said differential image ID represents a matrix of pixels, the value of each of the pixels of said matrix corresponding to the absolute value of the difference in the gray levels of the pixels located at the same position respectively in said two analysis images I1 and I2.

The differential image ID thus formed is transmitted to the means 6 which determine from it, using a binary conversion threshold S explained hereinbelow, a binary image IB shown in FIG. 6. The pixels of said binary image IB take a first value, for example 0, when the values of the corresponding pixels of the differential image ID are greater than or equal to said binary conversion threshold S, like for the regions R1 and R3 for example, and a second, preferably high, value in the contrary case.

The zones having the first value are therefore regarded as moving zones and those having the second value as stationary zones.

The binary conversion threshold used may be a predefined value stored, for example, in said means 6.

It will be observed that said binary conversion threshold has to be the result of a compromise between the speed of detection of the movement of the target and the amount of parasitic movements detected. The reason for this is that, the lower the threshold the greater is the detection of the movement of the target but also of the parasitic movements. However, if the parasitic movements become too great, it may become difficult, even impossible, to detect the movement of the target.

Thus, taking into account these observations, the device 1 advantageously includes means 17 which are connected via links 18 and 19, respectively, to the means 5 and 6 and which make it possible to match the binary conversion threshold to the processing being carried out and, in particular, to the differential Lmage used, as well as to the desired amount of movement to be detected.

According to the invention, in order to determine the binary conversion threshold S relating to a differential image ID received from the means 5, said means 17 carry out the following operations:

they determine the luminance of all the pixels of the differential image ID;

they form a histogram, not shown, representing the number of pixels per increasing luminance value;

they determine an upper luminance value Lsup corresponding to the luminance in said histogram of a first percentage, for example 95%, of the total number of said pixels;

they determine a lower luminance value Linf corresponding to the luminance in said histogram of a second percentage, for example 5%, less than said first percentage, of the total number of said pixels; and they compute the binary conversion threshold S from the equation S=(Lsup+Linf)/2.

Figure 7:
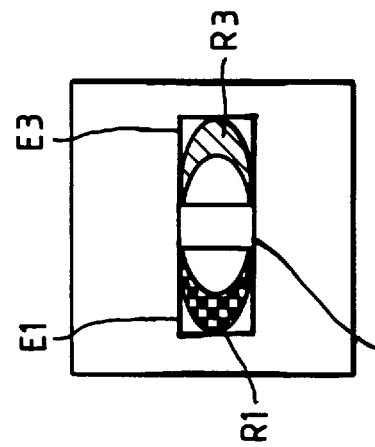
FIGS. 5 to 7 illustrate various successive steps in the image processing, in accordance with the invention.

Next, the binary image IB is transmitted:

firstly to the means 7 which individualize the moving zones, that is to say they group together the adjacent pixels having said first value into individualized zones, as for example the regions R1 and R3, and differentiate between them these individualized zones, the region R1 being shown for this purpose in the form of a checkerboard in FIG. 7 and the region R3 in the form of a hatched zone;

and then to the means 8 which:

on the one hand, determine, for each of said individualized zones R1 and R3, an individual envelope, respectively E1 and E3, of rectangular shape, surrounding said individualized zone; and on the other hand, determine an overall envelope EG, also of rectangular shape, surrounding all the individual envelopes E1 and E3 thus formed.

However, so as not to take into account too many parasitic movement zones of, in one particularly advantageous embodiment of the invention a temporal filtering of the binary image IB is carried out before transmitting it to the means 7.

For this purpose, the device 1 includes:

a memory 20 connected to the means 6 via a link 21 and storing a binary image arising from a preceding processing step; and an OR logic gate 22 connected via links 23 and 24 respectively to the means 6 and to said memory 20 and performing a logic OR between the binary image being processed, received from the means 6, and the binary image from the preceding processing step, received from the memory 20. The OR logic gate 22 transmits the image thus filtered to the means 7 via a link 25.

This filtering makes it possible to preserve only the movement zones which are coherent over time, which is not generally the case for parasitic movement zones.

Moreover, in one advantageous embodiment, all the individualized zones having an area which is greater than predefined area are selected from the binary image and in the rest of the processing only the individualized zones thus selected are taken into account.

This embodiment is particularly advantageous when the binary image has a large number of small individualized zones which are generally due to parasitic movements. Said embodiment therefore makes it possible, in conjunction with the temporal filtering described previously, to eliminate information of no interest for the processing to be carried out.

The analyzing means 9 receive the processing carried out by the means 8 and deduce:

that there is no detection of movement of the target C in the following cases:

when no individual envelope exists, since then no movement has been detected;

when a single individual envelope exists, since it is then impossible to determine whether the zone detected is a background region which is uncovered or covered by the target; and/or when the overall envelope has an area less than a predefined area, since the reliability of the processing may then be in doubt; and that, in the other cases, a movement of the target C is detected.

When a movement of the target C is detected, the analyzing means 9 may, in addition, determine a characteristic outline, not shown, corresponding to said movement of the target and relating to the position of the target C in the second of said pictures PV2.

Figure 6:
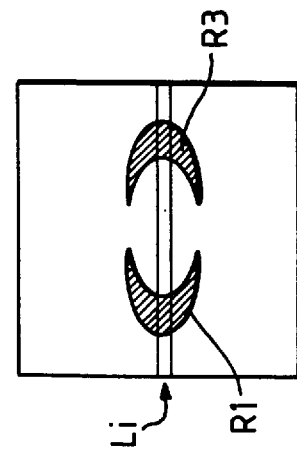
Figure 8:
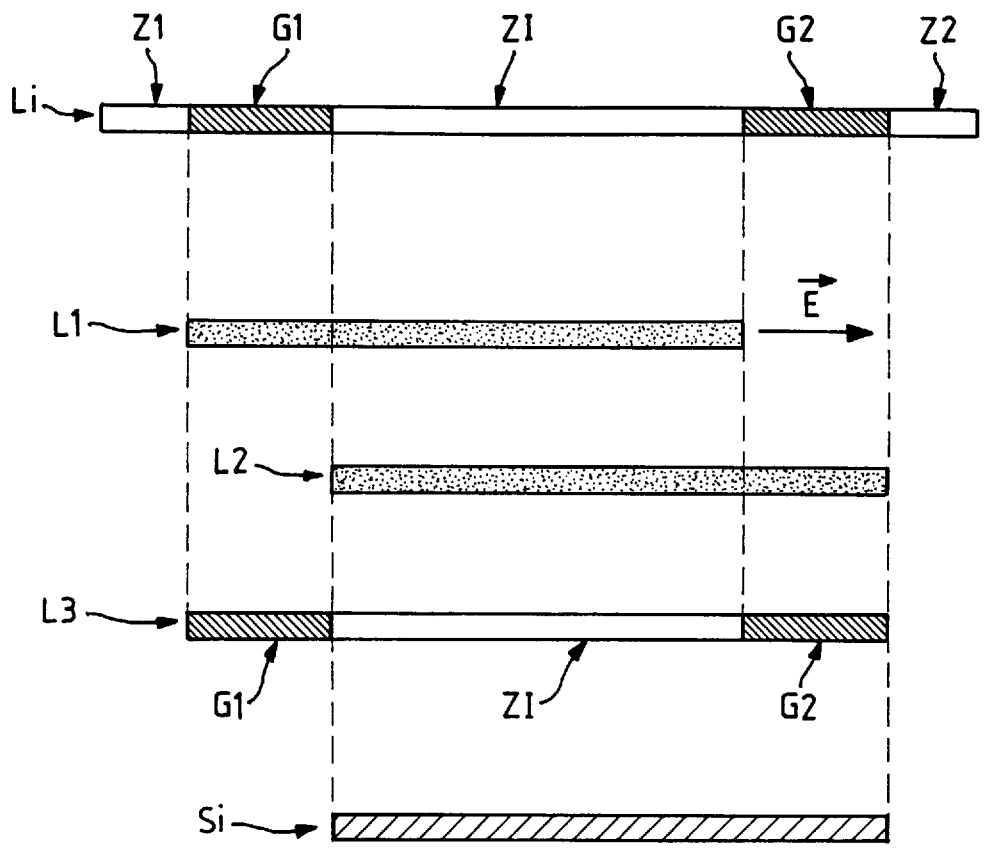
FIG. 8 shows the determination of a characteristic outline relating to a movement of the target.

According to the invention, in order to determine said characteristic outline:

α) for each of the lines of the overall envelope EG, the following operations are carried out:

a configuration formed by two groups G1 and G2 of the same number of adjacent pixels having said first value is sought, as is an intermediate zone ZI of pixels having said second value, this being located between said groups G1 and G2, as shown in FIG. 8 for a line Li, also indicated in FIG. 6;

if such a configuration exists, a characteristic segment Si formed by said intermediate zone ZI and by the group G2 located downstream in the direction of movement $\vec{E}$ of the target is determined, and if not the procedure passes to the next line of the overall envelope EG; and β) the characteristic segments Si thus determined are grouped together so as to obtain said characteristic outline.

Preferably, in particular for ease of data processing, a characteristic matrix of rectangular shape is formed from said characteristic outline, the pixels of this matrix relating to a moving zone, that is to say corresponding to said characteristic outline, taking a certain value, for example 1, the other pixels taking another value, for example 0.

FIG. 8 shows, in succession from the top to the bottom, with a corresponding shift to the right or left so as to demonstrate the various relationships:

the line Li of the binary image IB which includes, in addition to the mentioned zones G1, ZI and G2, outermost zones Z1 and Z2 represented as not moving. Of course, in the zones Z1, Z2 or ZI, partial moving zones may appear which correspond to parasitic movements and which are not taken into account if an associated zone of the same size does not exist on the line Li, as is the case for the groups of pixels G1 and G2;

a partial line L1 formed by the pixels of the target C in the line Li of the scan image I1;

a partial line L2 formed by the pixels of the target C in the line Li of the scan image I2, the partial line L2 being offset with respect to the line L1 due to the movement of the target in the direction of the arrow $\vec{E}$ between the analysis images I1 and I2;

a partial line L3 which includes only the zones of the line Li which are useful for detection; and the characteristic segment Si located, of course, at the same position as L2 when the entire target in question is moving.

The analyzing means 9 may transmit the results obtained via a link 26 to a user device, not shown.

Moreover, the present invention also makes it possible to determine a reference pattern, not shown, of the moving target C.

For this purpose, the device 1 includes means 27 which are connected via links 28 and 29 respectively to the means 4 and 9 and which, in order to determine a reference pattern of the target, carry out the following operations:

they identify the position of said characteristic outline, that is to say the position of the moving zones of said characteristic matrix, in the scan image 12 of the last of said pictures PV2, and they extract the pixels corresponding to this position, the pixels thus extracted forming said reference pattern of the target.

Next, the results thus obtained may be communicated via a link 30 to a user device, not shown.

The device 1 in accordance with the invention is furthermore particularly well suited to tracking targets, being, for example, integrated for this purpose into a weapon system, not shown, in particular an antitank system, equipped with said optical detector 2 and capable of destroying the target tracked.

The procedure in accordance with the invention has many possible applications. Thus, two applications of said procedure, specified-hereinbelow, especially allow advantageous improvement to the aforementioned method of locating a target, disclosed by the Applicant's French Patent Application 2,706,721.

As indicated previously, said method uses a target model which includes at least one reference pattern of the target, which has to be occasionally updated under certain conditions during implementation of said method.

In a first application of the invention using this method, the procedure in accordance with the invention is implemented with each picture and the target model, that is to say at least said reference pattern, is updated, at least partially, when a movement of the target is detected, which provides said method with a precise condition for updating the model.

In a second application of the invention using this method, the reference pattern is updated when necessary, in the manner described previously in accordance with the invention, which provides said method with an effective technique for updating the model.

We claim:

1. A process for detecting the movement of a target observed in the field of view of an optical detector from two successive pictures of said field of view, each of said pictures being formed by a matrix of pixels, said process comprising the steps of:

a) determining a differential image from two identical size analysis images corresponding respectively to at least part of said successive pictures, said differential image corresponding to a matrix of pixels, and the value of each of the pixels of said matrix corresponding to the absolute value of the difference in the gray levels of the pixels located at the same position respectively in said two analysis images;

b) forming a binary image from said differential image and from a defined binary conversion threshold, the pixels of said binary image taking a first value if luminance values of the corresponding pixels of the differential image are greater than or equal to said binary conversion threshold, and a second value if not;

c) individualizing a plurality of zones on said binary image, the pixels of said zones having said first value;

d) forming an overall envelope of defined shape surrounding said individual envelopes;

e) detecting whether or not movement of said target has occurred based on the whether said overall envelope has an area which is less than a predefined area; and f) if movement of said target has been detected, determining a characteristic outline corresponding to said movement of said target, said characteristic outline relating to the position of said target in a successive one of said pictures.

2. The process as claimed in claim 1, wherein the direction of movement of said target in said pictures is known and wherein said step f) comprises, for each of the lines of said overall envelope, the steps of:

detecting the presence of a configuration formed by two groups of the same number of adjacent pixels having said first value and an intermediate zone of pixels having said second value, said intermediate zone being located between said groups; and if said configuration exists, determining a characteristic segment formed by said intermediate zone and by the group located downstream in the direction of movement of said target; and grouping together a plurality of said characteristic segments to obtain said characteristic outline.

3. The process as claimed in claim 1, wherein said overall envelope has a rectangular shape.

4. The process as claimed in claim 1, additionally comprising the step of determining said binary conversion threshold, wherein said step of determining said binary conversion threshold comprises the following steps:

determining a luminance value of all the pixels of said differential image;

forming a histogram representing the number of pixels per increasing luminance value;

determining an upper luminance value, corresponding to a luminance value in said histogram, from a first percentage of the total number of said pixels;

determining a lower luminance value, corresponding to a luminance value in said histogram, from a second percentage of the total number of said pixels, said second percentage being less than said first percentage; and computing said binary conversion threshold as the average of said upper luminance value and said lower luminance value.

5. The process as claimed in claim 1, wherein the detection is made from at least three successive pictures and wherein at least two successive binary images are formed from said pictures, additionally comprising the step of temporally filtering said binary image by employing a logic OR between said binary image and the preceding binary image.

6. The process as claimed in claim 1, wherein a reference pattern of said target is formed by the steps of:

identifying the position of said characteristic outline in said analysis image of the last of said pictures; and extracting the pixels corresponding to said position, the pixels thus extracted forming said reference pattern of the target.

7. A process of determining the location of a target observed in the field of view of an optical detector, said method being based on the steps set forth in claim 1 and said method comprising the steps of:

taking a picture of the field of view of said optical detector;

determining a model of the background, including at least one partial image of the background;

determining a model of said target, including at least one reference pattern representing at least one partial image of the target; and repeating the following steps:

taking a current picture of the field of view;

isolating at least one background search window from said current picture;

seeking the partial image of the background in said isolated search window;

computing the movement of the optical detector between the preceding picture and said current picture from the position of this partial image in said search window;

isolating a target search window from the current picture, taking into account the computed movement of the optical detector and of the position of the target in the preceding picture;

seeking the reference pattern of the target in said isolated search window;

computing the movement of the target with respect to the background from the position of this reference pattern in said search window;

comparing said computed movement of the target with two, minimum and maximum, movement values determined from the kinematic characteristics of the target so that, if the computed movement lies between said two values, the location of the target obtained by this computed movement is validated, and if not an estimated position of the target is determined from the kinematic characteristics of the latter; and conditionally updating the background and target models, wherein the process specified in claim 1 is performed for each picture and the target model is updated, at least partially, when a movement of the target is detected.

8. A process of determining the location of a target observed in the field of view of an optical detector, said method being based on the steps set forth in claim 6 and said method comprising the steps of:

taking a picture of the field of view of said optical detector;

determining a model of the background, including at least one partial image of the background;

determining a model of said target, including at least one reference pattern representing at least one partial image of the target; and repeating the following steps:

taking a current picture of the field of view;

isolating at least one background search window from said current picture;

seeking the partial image of the background in said isolated search window;

computing the movement of the optical detector between the preceding picture and said current picture from the position of this partial image in said search window;

isolating a target search window from the current picture, taking into account the computed movement of the optical detector and of the position of the target in the preceding picture;

seeking the reference pattern of the target in said isolated search window;

computing the movement of the target with respect to the background from the position of this reference pattern in said search window;

comparing said computed movement of the target with two, minimum and maximum, movement values determined from the kinematic characteristics of the target so that, if the computed movement lies between said two values, the location of the target obtained by this computed movement is validated, and if not an estimated position of the target is determined from the kinematic characteristics of the latter; and conditionally updating the background and target models, wherein the process specified in claim 6 is performed for each picture and the target model is updated, at least partially, when a movement of the target is detected.

9. A device for detecting the movement of a target observed in the field of view of an optical detector from two successive pictures of said field of view, each of said pictures being formed by a matrix of pixels, said device comprising:

means for determining a differential image from two identical size analysis images corresponding respectively to at least part of said successive pictures, said differential image corresponding to a matrix of pixels, and the value of each of the pixels of said matrix corresponding to the absolute value of the difference in the gray levels of the pixels located at the same position respectively in said two analysis images;

means for forming a binary image from said differential image and from a defined binary conversion threshold, the pixels of said binary image taking a first value if luminance values of the corresponding pixels of the differential image are greater than or equal to said binary conversion threshold, and a second value if not;

means for individualizing a plurality of zones on said binary image, the pixels of said zones having said first value;

means for determining an individual envelope of defined shape surrounding each of said individualized zones;

means for detecting whether or not movement of said target has occurred based on the number of said individual envelopes; and means for determining a characteristic outline corresponding to said movement of said target if movement of said target has been detected, said characteristic outline relating to the position of said target in a successive one of said pictures.

10. The device as claimed in claim 9, additionally comprising means for selecting said individualized zones having an area which is greater than a predefined area and using only said selected individualized zones.

11. The device as claimed in claim 9, additionally comprising means for determining said binary conversion threshold.

12. The device as claimed in claim 9, additionally comprising means for determining a reference pattern of said target.

* * * * *